US011044762B2

(12) United States Patent
Liu et al.

(10) Patent No.: US 11,044,762 B2
(45) Date of Patent: Jun. 22, 2021

(54) METHODS AND APPARATUSES FOR RANDOM ACCESS TRANSMISSION (71) Applicant: Telefonaktiebolaget LM Ericsson (publ), Stockholm (SE)

(72) Inventors: Jinhua Liu, Beijing (CN); Rui Fan, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/603,456

(22) PCT Filed: May 3, 2018

(86) PCT No.: PCT/CN2018/085415
§ 371 (c)(1),
(2) Date: Oct. 7, 2019

(87) PCT Pub. No.: WO2018/202060
PCT Pub. Date: Nov. 8, 2018

(65) Prior Publication Data
US 2021/0014897 A1    Jan. 14, 2021

(30) Foreign Application Priority Data
May 5, 2017  (WO) ................ PCT/CN2017/083234

(51) Int. Cl.
*H04W 74/08* (2009.01)
*H04W 8/24* (2009.01)
(Continued)

(52) U.S. Cl.
CPC ......... *H04W 74/0833* (2013.01); *H04W 8/24* (2013.01); *H04W 16/28* (2013.01); *H04W 72/046* (2013.01); *H04W 74/006* (2013.01)

(58) Field of Classification Search
CPC ... H04W 74/0833; H04W 16/28; H04W 8/24; H04W 72/046; H04W 74/006
See application file for complete search history.

(56) References Cited

U.S. PATENT DOCUMENTS

2016/0192416 A1  6/2016 Nagata et al.
2016/0316491 A1  10/2016 Axmon et al.
2019/0104549 A1*  4/2019 Deng ................... H04B 7/0617

FOREIGN PATENT DOCUMENTS

CN    101156491 A    4/2008
CN    103650620 A    3/2014

OTHER PUBLICATIONS

Unknown, Author, "Determining starting PRACH resource set", 3GPP TSG RAN WG1 Meeting #82, R1-154603, Beijing, China, Aug. 24-28, 2015, pp. 1-4.
(Continued)

*Primary Examiner* — Thai Nguyen
(74) *Attorney, Agent, or Firm* — Murphy, Bilak & Homiller, PLLC (57) ABSTRACT Embodiments of the present disclosure relate to methods and apparatuses for random access transmission. In example embodiments, a method implemented in a terminal device is provided. According to the method, a first transmission resource set from a plurality of transmission resource sets is selected based on one or more of the following: a beam-forming reciprocity capability of the terminal device, and a geometry of the terminal device in a serving area of a network device. The plurality of transmission resource sets are indicated in information for one or more random access configurations received from the network device and are respectively corresponding to different numbers of random access transmissions. Up to a first number of random access signals are transmitted to the network device in a random
(Continued)

access request. The first number is corresponding to the first transmission resource set.

14 Claims, 5 Drawing Sheets

(51) Int. Cl.
    *H04W 16/28*     (2009.01)
    *H04W 72/04*     (2009.01)
    *H04W 74/00*     (2009.01)

(56) References Cited

OTHER PUBLICATIONS

Unknown, Author, "Determining starting PRACH resource set", 3GPP TSG RAN WG1 Meeting #81, R1-153213, Fukuoka, Japan, May 25-29, 2015, pp. 1-4.

* cited by examiner

METHODS AND APPARATUSES FOR RANDOM ACCESS TRANSMISSION

TECHNICAL FIELD

Embodiments of the present disclosure generally relate to the field of telecommunication, and in particular, to methods and apparatuses for random access transmission.

BACKGROUND

A random access (RA) procedure refers to a procedure for user equipment (UE) to establish a connection with a network device such as an Evolved NodeB (eNB). In a random access procedure, the UE may attempt to transmit a RA signal (for example, a physical RA channel (PRACH)) to the eNB in an initial access when, for example, the UE enters a serving area of the eNB or has disconnected from the eNB. The transmission of the RA signal may be interpreted by the eNB as a RA request and a RA response (RAR) may be provided to the UE depending on whether the RA signal is successfully received and/or whether the eNB can allocate uplink resources for the UE.

To meet the ever-increasing demand of wireless data traffic, New Radio (NR) techniques have been proposed to operate in a wide frequency range from below 1 Giga Hertz (GHz) to a very high frequency, for example, 100 GHz. As the frequency for wireless communication gets higher, propagation path loss from the UE to the network device increases. As a result, the efficient propagation distance decreases relatively and thus, service coverage decreases. A beam-forming technology is emerging as one of the technologies for mitigating the propagation path loss, increasing the propagation distance, and ensuring the coverage of both UEs and eNBs.

Beam-forming focuses waves on a specific service area by steering (for example, directing) transmitting signals from a plurality of antennas in a specific beam direction. If a direction of a best beam from a transmitting device is matched with the direction of a beam at the receiving side for receiving the transmitted signals, a beam match can be achieved. For RA with beam-forming, a beam match indicates a successful reception of a RA signal. However, the beam match between the eNB and UE is one issue since there is no good beam training to reach a beam match before the RA procedure. In current standardization work of the NR techniques, it has been discussed and agreed that UE can transmit the RA signal for a plurality of times to improve the probability of reaching a beam match between the UE and the eNB. In this case, more resources are required to support the multiple RA transmissions. Therefore, there is a need for a solution to improve resource efficiency in the RA procedure.

SUMMARY

In general, example embodiments of the present disclosure provide methods and apparatuses for random access transmission.

In a first aspect, there is provided a method implemented in a terminal device. According to the method, a first transmission resource set from a plurality of transmission resource sets is selected based on one or more of the following: a beam-forming reciprocity capability of the terminal device, and a geometry of the terminal device in a serving area of a network device. The plurality of transmission resource sets are indicated in information for one or more random access configurations received from the network device and are respectively corresponding to different numbers of random access transmissions. Up to a first number of random access signals are transmitted to the network device in a random access request. The first number is corresponding to the first transmission resource set.

In some embodiments, selecting the first transmission resource set includes in response to a determination that the beam-forming reciprocity capability of the terminal device is at a first level, selecting the first transmission resource set from the plurality of transmission resource sets that is corresponding to a smaller number of random access transmissions compared to if the beam-forming reciprocity capability of the terminal device is at a second level lower than the first level.

In some embodiments, selecting the first transmission resource set includes: in response to a determination that the geometry of the terminal device is corresponding to a first radio quality, selecting the first transmission resource set from the plurality of transmission resource sets that is corresponding to a smaller number of random access transmissions compared to if the geometry of the terminal device is corresponding to a second radio quality lower than the first radio quality.

In some embodiments, transmitting up to a first number of random access signals includes: transmitting up to the first number of random access transmissions in a single beam direction or in consecutive beam directions.

In some embodiments, the method further includes: in response to absence of a random access response for the random access request from the network device, selecting a second transmission resource set from the plurality of transmission resource sets. The second transmission resource set is corresponding to a second number of random access transmissions and the second number is larger than the first number. The method further includes transmitting, to the network device, up to the second number of random access signals in a further random access request.

In some embodiments, a first occurrence frequency of the first transmission resource set allocated in a time domain is higher than a second occurrence frequency of the second transmission resource set allocated in the time domain.

In some embodiments, each of the first number of random access signals corresponds to a physical random access channel (PRACH) transmission.

In a second aspect, there is provided a method implemented in a network device. According to the method, information for one or more random access configurations is transmitted to a terminal device. The information for one or more random access configurations indicates a plurality of transmission resource sets that are respectively corresponding to different numbers of random access transmissions. It is determined whether one or more of a first number of random access signals are received from the terminal device in a first transmission resource set of the plurality of transmission resource sets. The first number is corresponding to the first transmission resource set. In response to a determination that one or more of the first number of random access signals are received from the terminal device, the received one or more of the first number of random access signals are identified as belonging to a same random access request.

In some embodiments, a first occurrence frequency of the first transmission resource set allocated in a time domain is higher than a second occurrence frequency of a second transmission resource set allocated in the time domain, and the second transmission resource set is included in the plurality of transmission resource sets and is corresponding to a second number of random access transmissions that is larger than the first number.

In some embodiments, each of the first number of random access signals corresponds to a PRACH transmission.

In some embodiments, the information for one random access configuration includes an index for the one random access configuration indicating the plurality of transmission resource sets. In some embodiments, the information for two or more random access configurations include respective indices for the two or more random access configurations indicating the plurality of transmission resource sets.

In a third aspect, there is provided an apparatus at a terminal device. The apparatus includes a processor; and a memory coupled to the processing unit and storing instructions thereon, the instructions, when executed by the processing unit, causing the apparatus to perform the method according to the first aspect.

In a fourth aspect, there is provided an apparatus at a network device. The apparatus includes a processor; and a memory coupled to the processing unit and storing instructions thereon, the instructions, when executed by the processing unit, causing the apparatus to perform the method according to the second aspect.

In a fifth aspect, there is provided a computer program product that is tangibly stored on a computer readable storage medium. The computer program product includes instructions which, when executed on at least one processor, cause the at least one processor to carry out the method according to the first aspect or the second aspect.

In a sixth aspect, there is provided a computer readable storage medium having instructions stored thereon. The instructions, when executed on at least one processor, cause the at least one processor to carry out the method according to the first aspect or the second aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a Remote Radio Unit (RRU), a radio head (RH), a remote radio head (RRH), a low power node such as a femto node, a pico node, and the like. For the purpose of discussion, in the following, some embodiments will be described with reference to eNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UEs as examples of terminal devices and the terms "terminal device" and "user equipment" (UE) may be used interchangeably in the context of the present disclosure.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Figure 1:
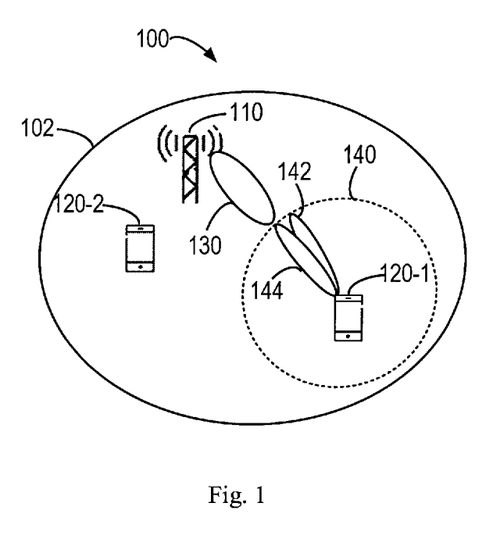
FIG. 1 is a block diagram of a communication environment in which embodiments of the present disclosure can be implemented.

FIG. 1 shows an example communication network 100 in which embodiments of the present disclosure can be implemented. The network 100 includes a network device 110 and terminal devices 120-1 and 120-2 (hereinafter collectively referred to as terminal devices 120 or individually referred to as a terminal device 120) served by the network device 110. The serving area of the network device 110 is called as a cell 102. It is to be understood that the number of network devices and terminal devices is only for the purpose of illustration without suggesting any limitations. The network 100 may include any suitable number of network devices and terminal devices adapted for implementing embodiments of the present disclosure. Although not shown, it would be appreciated that one or more terminal devices may be located in the cell 102 and served by the network device 110.

The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Typically, in order to communicate data with the network device 110, the terminal device 120 may initiate a random access procedure to establish a connection with the network device 110. Specifically, the terminal device 120 may transmit to the network device 110 a random access signal (for example, a physical random access channel (PRACH)) as a random access request in random access transmission opportunity (for example, a specified uplink resource). Upon successful reception of the random access signal, the network device 110 transmits to the terminal device 120 a random access response (RAR) indicating the successful reception. Otherwise, if no RAR is received from the network device 110 after waiting for a predetermined duration, for example, the terminal device 120 may understand that the random access request fails. In this case, the terminal device 120 may wait for another random access transmission opportunity to initiate the random access procedure again.

In current random access procedures, the terminal device 120 is allowed to transmit one random access signal in a random access request. For example, only one subframe is assigned to the terminal device 120 for transmission in a random access procedure. According to current communication specifications, for example, current long term-evolution (LTE) specifications, one of various predefined PRACH configurations is preconfigured in the cell 102. The network device 110 may notify the index of that PRACH configuration to the terminal device 120 via a broadcasted message, for example. The PRACH configuration may correspond to preconfigured resources and a preamble format available for transmitting the random access signal. One example of the predefined PRACH configurations is given in the following Table 1, which includes a portion of PRACH configurations specified in a LTE specification.

TABLE 1

| PRACH Configuration Index | Preamble Format | System frame number | Subframe number |
| --- | --- | --- | --- |
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |

As can be seen from Table 1, the system frame number (SFN) and subframe number (SN) specify the resource in which the random access signal can be transmitted. The preamble format specifies the format of the random access signal. For a PRACH configuration with multiple available subframes (for example, PRACH Configuration 9), the terminal device 120 can select one of the specified subframes (for example, subframe 1, 4, or 7) in any system frame to transmit the random access signal with a preamble format 0.

As mentioned above, with the development of New Radio (NR) techniques, a wide frequency range (from below 1 Giga Hertz (GHz) to a very high frequency, for example, 100 GHz) will be utilized, which brings an issue of increased propagation path loss and thus reduces the coverage of both the terminal devices 120 and network device 110. To deal with this problem, the beam-forming technology is emerging. To utilize the beam-forming technology, the terminal devices 120 and the network device 110 each may be equipped with a plurality of antennas for beam-forming transmission.

The beam-forming transmission may thus be employed in the random access transmission to ensure the coverage of the transmission. In some cases, the terminal device 120 may be able to perform beam repetition and/or beam sweeping in random access transmission with beam-forming. Since the terminal device 120 is allowed to transmit only one random access signal in one random access request, in order to perform beam repetition, the terminal device 120 may transmits random access signals in a plurality of random access request with the best beam (the main beam) in a single direction. To perform beam sweeping, the terminal device 120 is able to change the direction of the main beam in the different random access requests. Depending on whether there is a beam match between the terminal device 120 and the network device 110, the network device 110 can determine whether the random access signal is successfully received.

The random access transmission scheme with beam sweeping is illustrated in FIG. 1. In a first random access request, the terminal device 120-1 may transmit a random access signal in a specified subframe with a main beam in a particular direction, for example, a beam 142. The network device 110 may try to receive the random access signal in the specified subframe with its main beam 130 in a particular direction. Since the direction of the beam 130 does not match with the direction of the beam 142, there is a beam mismatch between the terminal device 120-1 and the network device 110. In this case, the terminal device 120-1 may wait for another random access transmission opportunity to initiate a second random access request (which may be in another specified subframe in a next available system frame) and transmit a random access signal in a different beam 144 in the second random access request. If the terminal device 120 performs transmissions in a clock-wise direction from the beam 142 until reaching the beam 144, its coverage is denoted as 140. It can be seen that the beam 144 matches with the beam 130 of the network device 110, which means that the second random access request based on the beam 144 is successful and a RAR may be probably provided by the network device 110.

According to the existing configurations for random access transmission for example, the PRACH configurations as indicated in Table 1, since the terminal device 120 is specified to transmit a random access signal for only one time in a random access request, even when employing the beam repetition or beam sweeping, the terminal device 120 has to wait for a plurality of random access requests to obtain the beam-forming gain.

With the development of the communication specifications, it has been discussed and agreed that a terminal device is allowed to perform more than one random access signal in a random access request to improve the probability of successful reception by a network device. Since the existing PRACH configuration scheme allows only one transmission of a PRACH signal in a random access request, it is not suitable for the proposed random access transmission scheme since more transmission resources are needed.

One possible solution is to increase the radio resources (for example, the time period for transmission or the number of subframes) configured for respective terminal devices to perform multiple random access transmissions in a random access request (or in a random access opportunity). For example, the network device may inform each terminal device in its serving area of one PRACH configuration which includes a plurality of subframes available for the terminal device to transmit a plurality of random access signals. This solution, however, will cause high radio resource consumption. In addition, the network device and all the terminal devices entering the serving area of the network device have to perform the transmissions and receptions in the configured subframes, which will also reduce the power efficiency of both the network device and terminal devices.

In order to address at least some of the above problems and other potential problems, according to embodiments of the present disclosure, there is proposed a solution for random access transmission. In this solution, a terminal device is able to determine whether to transmit one or more random access signals (for example, one or more PRACHs) in a single random access request. Specifically, the terminal device is provided by a network device with a plurality of transmission resource sets for random access. The plurality of transmission resource sets are corresponding to different numbers of transmissions. The terminal device can select a suitable transmission resource set from the plurality of transmission resource sets based on its own condition and transmit a number of random access signals corresponding to the selected transmission resource set. For example, the terminal device may select a suitable transmission resource set based on a beam-forming reciprocity capability of the terminal device and/or a geometry of the terminal device in the serving area of the network device.

Through this solution, instead of configuring all terminal devices in a serving area of a network device to perform the same number of random access transmissions, each terminal device is able to determine whether it would like to perform multiple random access transmissions or not and how many number of random access transmissions it would like to perform based on the actual condition of the terminal device. Therefore, for the terminal devices having beam-forming reciprocity capability and/or having its geometry indicating a high radio quality, a transmission resource set corresponding to a small number of transmissions (for example, one or two) may be selected. Since each random access transmission of the terminal device may consume a certain amount of radio resources (time and frequency resources), the proposed solution can reduce the overall resource consumption in the system. In addition, performing fewer random access transmissions will also reserve the power consumption for both the network device and corresponding terminal devices.

Principle and implementations of the present disclosure will be described in detail below with reference to FIG. 2, which shows a process 200 for random access (RA) transmission according to an embodiment of the present disclosure. For the purpose of discussion, the process 200 will be described with reference to FIG. 1. The process 200 may involve the network device 110 and the terminal device 120 in FIG. 1.

The network device 110 transmits (205) to the terminal device 120 information for one or more random access configurations indicating a plurality of transmission resource sets that are respectively corresponding to different numbers of transmissions. The information for one or more random access configurations is preconfigured in the network device 110 and is provided for the terminal device 120 to initiate a RA request (in a RA procedure) to transmit one or more RA signals. In some embodiments, the RA signal transmission to be performed by the terminal device 120 is to transmit one or more PRACHs and thus a random access configuration may be called as a PRACH configuration. For the purpose of illustration and clarity, a random access configuration informed by the network device 110 and a PARCH configuration are used interchangeably used hereinafter. Other types of RA signals and other terminologies of a RA signal may also be suitable in implementations of the present disclosure.

Since no connection is established between the network device 110 and the terminal device 120 before the RA request, the information for one or more PRACH configurations may be transmitted from the network device 110 in a broadcast message, for example, in system information (SI). In some example, the network device 110 may provide omnidirectional transmission of the information (for example, the system information). In this way, the terminal device 120 may detect the information from the omnidirectional transmission.

According to embodiments of the present disclosure, a plurality of transmission resource sets corresponding to different numbers of transmissions are provided in the information to the terminal device 120, so that the terminal device 120 can select one of the transmission resource sets for use in a RA request. In some embodiments, as indicated by the transmitted information, a transmission resource set may be corresponding to one RA transmission, for example, a PRACH, while other transmission resource sets may be respectively corresponding to two or more RA transmissions, correspondingly, a same PRACH for two or more times. In some other embodiments, all the plurality of transmission resource sets may be corresponding to more than two RA transmissions, each for a different number of transmissions.

The plurality of transmission resource sets may be indicated in respective PRACH configurations in some embodiments, with each PRACH configuration corresponding to a different number of RA transmissions. Each PRACH configuration may be identified by an index. For example, it is supposed that three different configurations indicate three different transmission resource sets for three different numbers of RA transmissions, as illustrated in the following Table 2-1. In some embodiments, the network device 110 may transmit the indices of the respective PRACH configurations to the terminal device 120 to indicate the transmission resource sets.

TABLE 2-1

| PRACH Config. Index | Config. Parameters |
| --- | --- |
| 0 | Transmission resource set 1 for one transmission |
| 1 | Transmission resource set 2 for two transmissions |
| 2 | Transmission resource set 3 for five transmissions |

It would be appreciated that Table 2-1 is shown as an example and the network device 110 may transmit information for more or less PRACH configurations or different PRACH configurations to the terminal device 120.

In some embodiments, for each of the PRACH configurations, its transmission resource set may be defined by time and/or frequency radio resources for uplink transmission. For example, a transmission resource set for a PRACH configuration may be allocated with one or more continuous or discrete system frame numbers (SFNs) and one or more continuous or discrete subframe numbers (SNs) within the system frame(s) indicated by the SFNs. In some embodiments, the number of RA transmissions corresponding to each transmission resource set is depending on the total duration specified by the transmission resource set and a time consumption of a RA transmission performed by the terminal device 120. For example, if the terminal device 120 is capable of sending a RA signal in one subframe, then the number of RA transmissions is determined as the total number of subframes available in each transmission resource set.

Depending on the manners of RA transmissions to be performed, instead of or in addition to allocating some or all of RA transmissions of the terminal device 120 across different time resources, some or all of different RA transmissions may be distributed across different frequency resources. For example, some or all of the RA transmissions by the terminal device 120 may be sent at different frequencies (frequency blocks). In this example, some or all of the transmission resource sets may be further allocated with the corresponding frequency resources (one or more frequency blocks) for the RA transmissions. In this case, some or all of transmission resource sets may have the same duration but are corresponding to different frequency resources.

In some alternative embodiments, some or all of the plurality of transmission resource sets may be indicated in one PRACH configuration. That is, there may be only a single PRACH configuration in the cell 102, which is designed to indicate the plurality of different transmission resource sets. The single PRACH configuration may indicate different groups of time and/or frequency radio resources, each group for a transmission resource set. The PRACH configuration may define one or more continuous or discrete SFNs and some continuous or discrete SNs in system frames indicated by the SFNs. As an alternative or in addition, the PRACH configuration may define different frequency resources for some or all of the transmission sets. As a specific example, a first number of subframes (for example, one subframe) in an even system frame are grouped into a first transmission resource set and a second number of subframes (for example, three subframes) in an odd system frame are grouped into a second transmission resource set.

There may be other manners to design different transmission resource sets in one PRACH configuration and the scope of the present disclosure is not limited in this regard. In the embodiments of one PRACH configuration, the network device 110 may transmit only one index for this single PRACH configuration to the terminal device 120, which may reduce the overhead of conveying the PRACH configuration compared with the embodiments where the respective indices for multiple PRACH configurations are needed.

In some embodiments, the one or more PRACH configurations further indicate other parameters for the RA transmission, such as the signal format corresponding to each of the PRACH configurations. There may be a large number of PRACH configurations are preset in the network 100 including the cell 102 of the network device 110. The mapping between the large number of PRACH configurations and the radio resources and/or signal format are preset in the terminal device 120 or may be obtained via other manners (for example, via a broadcast message from the network device 110). In this case, the terminal device 120 may identify the one or more PRACH configurations from the preconfigured configurations based on the one or more indices received from the network device 110 at 205.

In some embodiments, since a transmission resource set corresponding to a large number of RA transmissions may consume more radio resources, in order to control the resource overhead, an occurrence frequency of this transmission resource set allocated in the time and/or frequency resource domains may be lower than an occurrence frequency of a transmission resource set that is corresponding to a smaller number of transmissions. The occurrence frequency of a transmission resource set is based on the SFN(s), SN(s), and/or frequency resources allocated for the transmission resource set.

Figure 3:
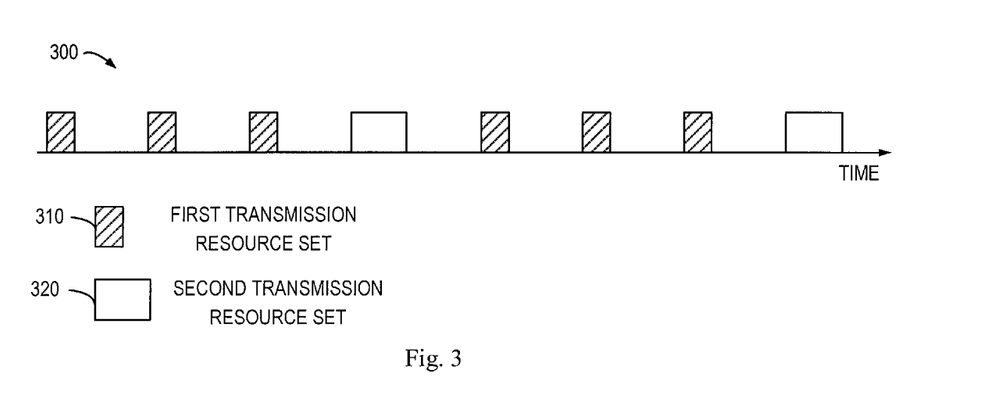
FIG. 3 is a schematic diagram illustrating occurrence frequencies of transmission resource sets in accordance with some embodiments of the present disclosure.

FIG. 3 shows a schematic diagram illustrating occurrence frequencies of transmission resource sets occurred in a time domain according to an embodiment of the present disclosure. The transmission resource set 310 has a shorter duration than the transmission resource set 320 and thus is corresponding to a smaller number of RA transmissions than the transmission resource set 320 (supposing that the RA transmissions are distributed in the time domain only). To reduce save the time resources, the transmission resource set 310 is defined as occurring more frequently than the transmission resource set 320. For example, the transmission resource set 310 is occurred in each system frame (occupying one subframe in the system frame, for example) while the transmission resource set 320 occurs every four system frames (occupying five subframes in one or more of the four system frames, for example).

It would be appreciated that the durations of the transmission resource sets 310 and 320 are merely illustrated as an example. Although in this example the transmission resource set 320 corresponding to a larger number of RA transmissions is shown as having a longer duration, a transmission resource set with a long duration (or a large frequency range) is not necessarily corresponding to a larger number of RA transmissions compared with other transmission resource sets because discrete time and frequency resources can be allocated for the transmission resource set.

Referring back to FIG. 2, with the information from the network device 110, the terminal device 120 selects (210) a transmission resource set from the plurality of transmission resource sets. The terminal device 120 may determine to select the resource set when a RA request is to be initiated. For the purpose of illustration, the transmission resource set selected here is referred to as a first transmission resource set. In embodiments of the present disclosure, the terminal device 120 may select the first transmission resource set from the plurality of transmission resource sets based on its own condition, for example, its own capability in performing the RA transmission and a possible radio quality of the terminal device 120.

In performing RA transmission, the capability that can affect the selection of the first transmission resource set is a beam-forming reciprocity capability of the terminal device 120. As used herein, in beam-forming based transmission, a beam-forming reciprocity capability refers to a capability of deducing a suitable beam direction in an uplink based on a beam direction in a reverse downlink and vice versa. That is to say, if the terminal device 120 has a beam-forming reciprocity capability, it may be able to estimate a rough or precise beam direction of the network device 110 in downlink and thus determine a beam direction for uplink RA transmission that probably matches with the beam direction of the network device 110. This may help the terminal device 120 to achieve a beam match more easily by only performing fewer RA transmissions (for example, one or two RA transmissions). Therefore, the beam-forming reciprocity capability of the terminal device 120 may be used as a factor to determine which transmission resource set among all the possible transmission resource sets is suitable for the terminal device 120.

The beam-forming reciprocity capability may depend on a software level and/or hardware level configuration of the terminal device 120. For example, to support the beam-forming reciprocity capability, the terminal device 120 may be able to calculate the beam direction for transmission through a corresponding algorithm and/or with support of some hardware components. There are various methods (either currently existing or to be developed in the future) to implement the beam-forming reciprocity in the terminal device 120 and the scope of the present disclosure is not limited in this regard. The terminal device 120 may be aware of its beam-forming reciprocity capability by itself and/or from other parties.

In some embodiments, the terminal device 120 may select the first transmission resource set from the plurality of transmission resource sets based on the level of its beam-forming reciprocity capability. The level of the beam-forming reciprocity capability may be measured based on the precision of the beam direction calculated by the terminal device 120 for uplink RA transmission. For example, there may be three levels of beam-forming reciprocity capability, including a high level, a middle level, and a low level. The high level of beam-forming reciprocity capability indicates that a beam direction calculated by the terminal device 120 has a high precision and thus may be highly likely to match with the beam direction of the network device 110, while the middle level of beam-forming reciprocity capability indicates that the calculated beam direction has a low precision. The low level of beam-forming reciprocity capability may indicate that the beam direction has a lower precision or the terminal device 120 may even not be capable of deducing a beam direction for the uplink RA transmission from the downlink beam direction. It would be appreciated that, although three levels of beam-forming reciprocity capability are described, there may be more or less levels of beam-forming reciprocity capability. For example, there may be only two levels depending on whether it owns the beam-forming reciprocity capability or not.

In some embodiments, if it is determined that the beam-forming reciprocity capability of the terminal device 120 is at a first level (for example, a level indicating that the terminal device 120 has a beam-forming reciprocity capability), the terminal device 120 may select the first transmission resource set that is corresponding to a smaller number of RA transmissions compared to if the beam-forming reciprocity capability of the terminal device 120 is at a second level lower than the first level (for example, a level indicating that the terminal device 120 lacks a beam-forming reciprocity capability). In other words, if the terminal device 120 has a beam-forming reciprocity capability, it may select a transmission resource set corresponding to fewer RA transmissions (for example, one RA transmission) as the first transmission resource set; otherwise, it may select a transmission resource set corresponding to a larger number of RA transmissions (for example, five RA transmissions) as the first transmission resource set.

The factor of beam-forming reciprocity capability used in selecting the first transmission resource set has been discussed above. As an alternative or in addition to the factor of the beam-forming reciprocity capability, the terminal device 120 may also select the first transmission resource set based on a factor of a geometry of the terminal device 120 in the serving area 102 of the network device 110. A geometry of the terminal device 120 may indicate a radio quality of the terminal device 120 in the serving area 102, for example, a radio quality of an uplink from the terminal device 120 to the network device 110. If a geometry of the terminal device 120 is corresponding to a high radio quality, it means that the a propagation path loss from the terminal device 120 to the network device 110 is low, and thus there is a relatively high probability that the network device 110 can successfully receive a RA signal transmitted by the terminal device 120. Otherwise, a RA signal transmitted from the terminal device 120 may experience a relatively high propagation path loss.

The geometry of the terminal device 120 may be measured by one or more of various metrics, examples of which include but are not limited to a Reference Signal Received Power (RSRP), a Reference Signal Receiving Quality (RSRQ), a Signal Noise Ratio (SNR) or a Signal to Interference plus Noise Ratio (SINR) in the uplink, a distance between the terminal device 120 and the network device 110, and/or any other metrics that can reflect a radio quality of the terminal device 120. Those metrics may be measured by the terminal device 120 and/or provided by other devices.

In some embodiments, the terminal device 120 may select the first transmission resource set based on the radio quality corresponding to the geometry of the terminal device 120. If it is supposed that the geometry of the terminal device 120 is corresponding to a first radio quality, the terminal device 120 may select the first transmission resource set that is corresponding to a smaller number of RA transmissions compared to if the geometry of the terminal device is corresponding to a second radio quality lower than the first radio quality. In some embodiment, the terminal device 120 may select the first transmission resource set that is corresponding to a smaller number of RA transmissions in the case where its radio quality is worse than a predefined radio quality. Based on the geometry, the terminal device 120 with a relatively high radio quality may need fewer RA transmissions, while the terminal device 120 with a lower radio quality may need more RA transmissions. In some embodiments, the plurality of transmissions periods may be defined as being suitable for different radio qualities. If the terminal device 120 determines that its geometry indicates one of the different radio qualities, it may select the corresponding transmission resource set as the first transmission resource set.

In the above discussion, it has been described how each of the beam-forming reciprocity capability and the geometry of the terminal device 120 can be used in selecting the first transmission resource set. In some other embodiments, the two factors may be used in combination with each other to condition which transmission resource set can be selected from the plurality of transmission resource sets as the first transmission resource set. There may be conditions of selection of the respective transmission resource sets defined in the terminal device 120. For example, there may be a mapping between respective transmission resource sets and conditions of usage of the respective transmission resource sets. The terminal device 120 may check this mapping when selecting the first transmission resource set. As an example, Table 2-2 illustrates how the two factors can be used alone or in combination to select one of the three transmission resource sets as shown in Table 2-1.

TABLE 2-2

| PRACH Config. Index | Config. Parameters | Conditions of Selection |
|---|---|---|
| 0 | Transmission resource set 1 for one transmission | Having a beam-forming reciprocity capability at a high level; and/or Having a geometry corresponding to a high radio quality |
| 1 | Transmission resource set 2 for two transmissions | Having a beam-forming reciprocity capability at a middle level; and/or Having a geometry corresponding to a middle radio quality |
| 2 | Transmission resource set 3 for five transmissions | Having a beam-forming reciprocity capability at a low level; and/or Having a geometry corresponding to a poor radio quality |

Figure 2:
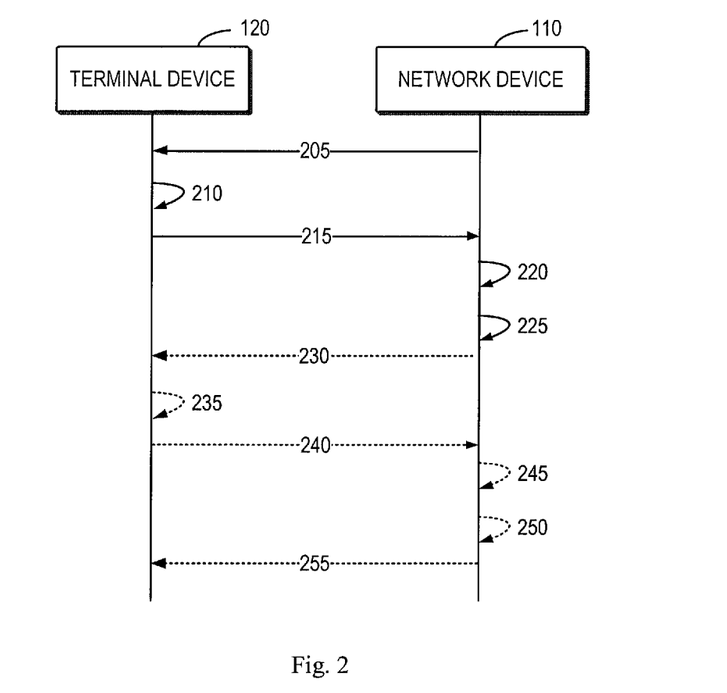
FIG. 2 is a flowchart illustrating a process for random access transmission according to some other embodiments of the present disclosure.

Still referring to FIG. 2, if a first transmission resource set is selected, the terminal device 120 transmits (215) up to a first number of RA signals in a RA request to the network device 110. The first number is corresponding to the first transmission resource set. Depending on the selected first transmission resource set, the first number may be one, two, five, or any other number. Each of the first number of RA signal may correspond to a PRACH transmission of the RA request.

In embodiments of the present disclosure, a RA request belongs to a RA procedure where one RAR may be transmitted from the network device 110 in case that one or more of the transmitted RA signal(s) is successfully received. Depending on the first transmission resource set, the terminal device 120 is allowed to transmit one or more RA signals in a RA request, and each transmission of a RA signal can be considered as a RA transmission. The information and format of a RA signal may be specified by the PRACH configuration and/or may be predefined in the terminal device 120. In some embodiments, a RA signal may include a PRACH.

In some embodiments where the first number is greater than one, after a RA signal is transmitted, the network device 110 may determine whether a RAR can be transmit to the terminal device 120. The RAR may be transmitted based on the successful reception of the RA signal by the network device 110 and/or some other factors, such as available uplink resources, traffic load at the network device 110, and the like. The criterion for determination of the RAR transmission at the network device is not limited in the present disclosure. If the terminal device 120 receives a RAR during the first transmission resource set, it may stop transmitting other RA signal(s). As such, the terminal device 120 may not have to transmit exactly the first number of RA signals, and thus the number of the transmitted RA signals may or may not be equal to the first number corresponding to the selected first transmission resource set. Of course, if the first number is equal to one, the terminal device 120 may always transmit that one RA signal.

In some embodiments where more than one RA signal is to be transmitted, the terminal device 120 may employ beam repetition and/or beam sweeping to improve the transmission coverage and/or obtain the beam-forming gain. In the beam repetition, the terminal device 120 may transmit the first number of RA signals in a certain beam direction. In this case, the RA signals are transmitted in a same beam direction to increase the beam-forming gain at the network device 110. In the beam sweeping scenario, especially in a narrow beam sweeping scenario, the terminal device 120 may transmit up to the first number of RA signals in consecutive beam directions. Two consecutive beam directions may be closed to each other or have a certain angle difference. By employing the beam sweeping, a large coverage and a high beam-forming gain can be achieved. In some embodiments, the single or consecutive beam directions can be randomly selected by the terminal device 120. As an alternative, if the terminal device 120 has some level of beam-forming reciprocity capability, it may calculate a precise or relatively rough beam direction for each of the RA transmissions (depending on its reciprocity level).

At the network side, the network device 110 detects a RA signal(s) in all specified radio resources in its downlink beam direction. The network device 110 determines (220) whether one or more of the first number of RA signals are received from the terminal device in the first transmission resource set. In some embodiments, if there is a beam match in a transmission of a RA signal, the RA signal can be successfully received. Depending on the beam match or mismatch and/or the propagation path loss, the network device 110 may receive some or all of the RA signals transmitted from the terminal device 120 where the number of the transmitted RA signals is up to the first number. In some embodiments, in response to reception of one or more of the RA signals from the terminal device 120, the network device 110 identifies (225) the received one or more RA signals as belonging to a same RA request. If the RA request is identified, which means that the network device 110 recognizes that the terminal device 120 attempts to request a random access, the network device 110 may send (230) a RAR for the RA request to the terminal device 120. In response to reception of the RAR at the interval of transmission of two RA signals, the terminal device 120 may stop transmitting additional RA signals (if any) to the network device 110. This is another reason why the network device 110 may receive a number of RA signals fewer than the first number.

In some other cases, the network device 110 may decide whether a RAR can be transmitted at 230 after the terminal device 120 transmits all the first number of RA signals. The network device 110 may determine that a RAR can be transmitted if all or a predetermined number of RA signals are received from the terminal device 120. In addition, the transmission of a RAR may be based on some other factors, such as available uplink resources, traffic load at the network device 110, and the like. In some embodiments, the network device 110 may allocate available uplink resources in the RAR to the terminal device 120 for uplink transmission. The RAR may indicate to the terminal device 120 that one or more RA signals have been received by the network device 110. If the RAR is received, the terminal device 120 knows that the RA request in the first transmission resource set is successfully transmitted.

If the terminal device 120 fails to receive any RAR from the network device 110 (for example, after a predetermined time period from the first transmission resource set), the terminal device 120 may initiate another RA procedure for another RA request in specified resources. In this RA request, the terminal device 120 may not have to receive additional PRACH configurations from the network device 110, but can select (235) another transmission resource set from the plurality of transmission resource set obtained previously. The other transmission resource set selected in a further RA request is referred to as a second transmission resource set for the purpose of clarity.

In cases where the terminal device 120 receives a RAR from the network device 110 but no uplink resources are allocated, the terminal device 120 may select the same transmission resource set as in the previous RA request (that is, the first transmission resource set) for the RA transmissions in a further RA request. In cases where no RAR is received, the terminal device 120 may select the second transmission resource set that is corresponding to a greater second number of RA transmissions than the first number. This is because the absence of the RAR means that the network device 110 may not be able to receive the RA signals from the terminal device 120 if the first transmission resource set is used. A greater number of RA transmissions help increase the probability of successful reception.

The terminal device 120 may transmit (240) up to the second number of RA signals in another RA request to the network device 110. The RA transmissions at 240 are similar to the RA transmissions at 230, and the possible difference only lies in that different resources and/or different numbers of RA signals are to be transmitted. For the sake of brevity, the detailed description is omitted here. The network device 110 detects RA signals in specified resources of the second transmission resource set and determines (245) whether one or more of the second number of RA signals are received from the terminal device in the second transmission resource set. In response to a determination that one or more of the second number of RA signals are received from the terminal device 120, the network device 110 identifies (250) the received one or more RA signals as belonging to a same RA request. In this case, the network device 110 sends (255) a RAR for the RA request to the terminal device 120. The determination, identification and sending at 245, 250, and 255 are similar to the operations at 220, 225, and 230. Thus, the detailed description is omitted here for the sake of clarity.

In cases where one or more of the second number of RA signals are not received and identified by the network device 110 as belonging to a RA request, no RAR is transmitted to the terminal device 120. It would be appreciated that one or more additional RA requests may be initiated by the terminal device 120 if no RAR is received or if no uplink resources are allocated in the received RAR. The same RAR procedure as described in the above may be performed at the terminal device 120 and the network device 110 in these cases.

Figure 4:
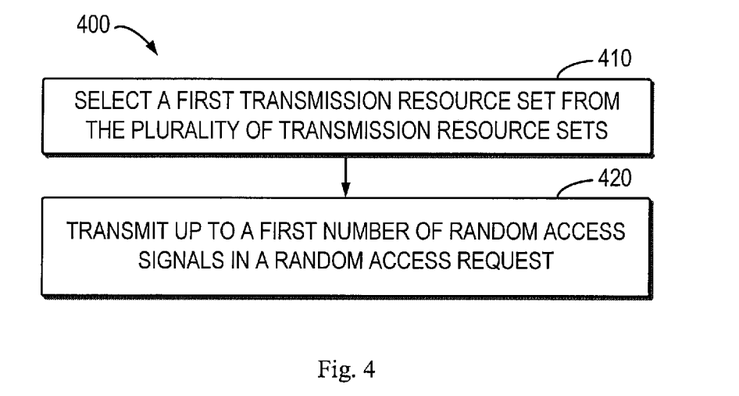
FIG. 4 shows a flowchart of an example method in accordance with some embodiments of the present disclosure.

FIG. 4 shows a flowchart of an example method 400 in accordance with some embodiments of the present disclosure. The method 400 can be implemented at the terminal device 120 as shown in FIG. 1. For the purpose of discussion, the method 400 will be described from the perspective of the terminal device 120 with reference to FIG. 1.

At block 410, the terminal device 120 selects a first transmission resource set from a plurality of transmission resource sets based on one or more of the following: a beam-forming reciprocity capability of the terminal device 120, and a geometry of the terminal device 120 in a serving area 102 of a network device 110. The plurality of transmission resource sets are indicated in information for one or more random access configurations received from the network device and are respectively corresponding to different numbers of random access transmissions. At block 420, the terminal device 120 transmits, to the network device 110, up to a first number of random access signals in a random access request. The first number is corresponding to the first transmission resource set.

In some embodiments, the terminal device 120 may select the first transmission resource set by: in response to a determination that the beam-forming reciprocity capability of the terminal device is at a first level, selecting the first transmission resource set from the plurality of transmission resource sets that is corresponding to a smaller number of random access transmissions compared to if the beam-forming reciprocity capability of the terminal device is at a second level lower than the first level.

In some embodiments, the terminal device 120 may select the first transmission resource set by: in response to a determination that the geometry of the terminal device is corresponding to a first radio quality, selecting the first transmission resource set from the plurality of transmission resource sets that is corresponding to a smaller number of random access transmissions compared to if the geometry of the terminal device is corresponding to a second radio quality lower than the first radio quality.

In some embodiments, the terminal device 120 may transmit up to a first number of random access signals by: transmitting up to the first number of random access transmissions in a single beam direction or in consecutive beam directions.

In some embodiments, the method 400 may further include: in response to absence of a random access response for the random access request from the network device, selecting a second transmission resource set from the plurality of transmission resource sets. The second transmission resource set is corresponding to a second number of random access transmissions and the second number is larger than the first number. The method 400 may further include transmitting, to the network device, up to the second number of random access signals in a further random access request.

In some embodiments, a first occurrence frequency of the first transmission resource set allocated in a time domain may be higher than a second occurrence frequency of the second transmission resource set allocated in the time domain.

In some embodiments, each of the first number of random access signals may correspond to a PRACH transmission.

In some embodiments, the information for one random access configuration may include an index for the one random access configuration indicating the plurality of transmission resource sets. In some embodiments, the information for two or more random access configurations may include respective indices for the two or more random access configurations indicating the plurality of transmission resource sets.

It is to be understood that all operations and features related to the terminal device 120 described above with reference to FIGS. 2 and 3 are likewise applicable to the method 400 and have similar effects. For the purpose of simplification, the details will be omitted.

Figure 5:
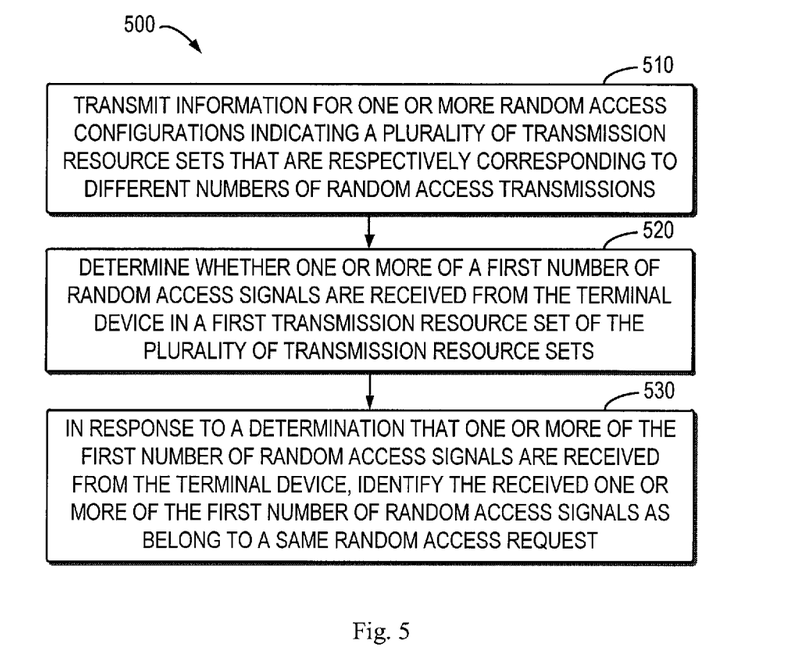
FIG. 5 shows a flowchart of an example method in accordance with some other embodiments of the present disclosure.

FIG. 5 shows a flowchart of an example method 500 in accordance with some embodiments of the present disclosure. The method 500 can be implemented at the network device 110 as shown in FIG. 1. For the purpose of discussion, the method 500 will be described from the perspective of the network device 110 with reference to FIG. 1.

At block 510, the network device 110 transmits, to the terminal device 120, information for one or more random access configurations indicating a plurality of transmission resource sets that are respectively corresponding to different numbers of random access transmissions. At block 520, the network device 110 determines whether one or more of a first number of random access signals are received from the terminal device in a first transmission resource set of the plurality of transmission resource sets. The first number is corresponding to the first transmission resource set. At block 530, the network device 110 identifies, in response to a determination that one or more of the first number of random access signals are received from the terminal device, the received one or more of the first number of random access signals as belonging to a same random access request.

In some embodiments, a first occurrence frequency of the first transmission resource set allocated in a time domain may be higher than a second occurrence frequency of a second transmission resource set allocated in the time domain, and the second transmission resource set is included in the plurality of transmission resource sets and is corresponding to a second number of random access transmissions that is larger than the first number.

In some embodiments, each of the first number of random access signals may correspond to a PRACH transmission. In some embodiments, the information for one random access configuration may include an index for the one random access configuration indicating the plurality of transmission resource sets. In some embodiments, the information for two or more random access configurations may include respective indices for the two or more random access configurations indicating the plurality of transmission resource sets.

It is to be understood that all operations and features related to the network device 110 described above with reference to FIGS. 2 and 3 are likewise applicable to the method 500 and have similar effects. For the purpose of simplification, the details will be omitted.

Figure 6:
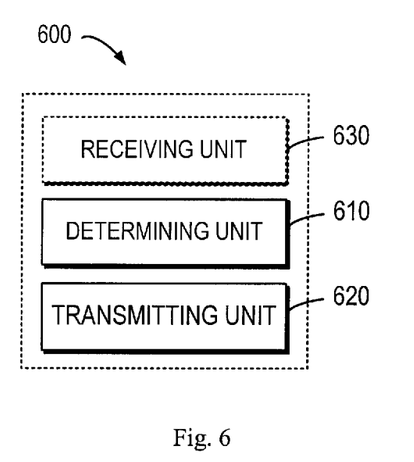
FIG. 6 is a block diagram of an apparatus at a terminal device in accordance with some embodiments of the present disclosure.

FIG. 6 shows a block diagram of an apparatus 600 at a terminal device in accordance with some embodiments of the present disclosure. The apparatus 600 can be implemented as or implemented in the terminal device 120 as shown in FIGS. 1 and 2. As shown, the apparatus 600 includes a selecting unit 610 configured to select a first transmission resource set from a plurality of transmission resource sets based on one or more of the following: a beam-forming reciprocity capability of the terminal device, and a geometry of the terminal device in a serving area of a network device. The plurality of transmission resource sets are indicated in information for one or more random access configurations received from the network device and are respectively corresponding to different numbers of random access transmissions. The apparatus 600 may optionally include a receiving unit 630 configured to receive the information. The apparatus 600 also includes a transmitting unit 620 configured to transmit, to the network device, up to a first number of random access signals in a random access request. The first number is corresponding to the first transmission resource set.

In some embodiments, the selecting unit 610 may be configured to: in response to a determination that the beam-forming reciprocity capability of the terminal device is at a first level, select the first transmission resource set from the plurality of transmission resource sets that is corresponding to a smaller number of random access transmissions compared to if the beam-forming reciprocity capability of the terminal device is at a second level lower than the first level.

In some embodiments, the selecting unit 610 may be configured to: in response to a determination that the geometry of the terminal device is corresponding to a first radio quality, select the first transmission resource set from the plurality of transmission resource sets that is corresponding to a smaller number of random access transmissions compared to if the geometry of the terminal device is corresponding to a second radio quality lower than the first radio quality.

In some embodiments, the transmitting unit 620 may be configured to: transmit up to the first number of random access transmissions in a single beam direction or in consecutive beam directions.

In some embodiments, the selecting unit 610 may be further configured to: in response to absence of a random access response for the random access request from the network device, select a second transmission resource set from the plurality of transmission resource sets. The second transmission resource set is corresponding to a second number of random access transmissions and the second number is greater than the first number. The transmitting unit 620 may be configured to transmit, to the network device, up to the second number of random access signals in a further random access request.

In some embodiments, a first occurrence frequency of the first transmission resource set occurred in a time domain may be higher than a second occurrence frequency of the second transmission resource set occurred in the time domain.

In some embodiments, each of the first number of random access signals may correspond to a PRACH transmission.

In some embodiments, the information for one random access configuration may include an index for the one random access configuration indicating the plurality of transmission resource sets. In some embodiments, the information for two or more random access configurations may include respective indices for the two or more random access configurations indicating the plurality of transmission resource sets.

Figure 7:
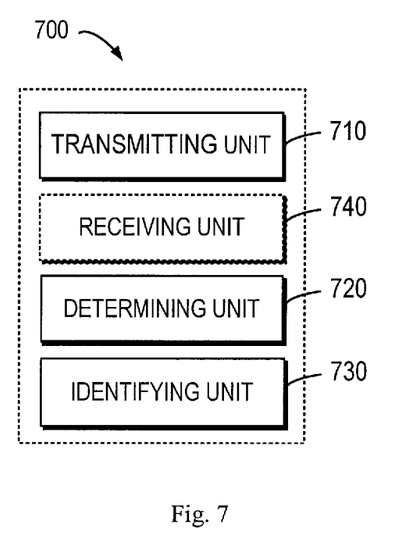
FIG. 7 is a block diagram of an apparatus at a network device in accordance with some embodiments of the present disclosure.

FIG. 7 shows a block diagram of an apparatus 700 at a terminal device in accordance with some embodiments of the present disclosure. The apparatus 700 can be implemented as or implemented in the network device 110 as shown in FIGS. 1 and 2. As shown, the apparatus 700 includes a transmitting unit 710 configured to transmit, to the terminal device, information for one or more random access configurations indicating a plurality of transmission resource sets that are respectively corresponding to different numbers of random access transmissions. The apparatus 700 also includes a determining unit 720 configured to determine whether one or more of a first number of random access signals are received from the terminal device in a first transmission resource set of the plurality of transmission resource sets. The first number is corresponding to the first transmission resource set. The apparatus 700 may include an optional receiving unit 740 to receive one or more of the first number of random access signal from the terminal device. The apparatus 700 further includes an identifying unit 730 configured to identify, in response to a determination that one or more of the first number of random access signals are received from the terminal device, the received one or more of the first number of random access signals as belonging to a random access request.

In some embodiments, the plurality of transmission resource sets may include a second transmission resource set corresponding to a second number of random access transmissions that is greater than the first number, and a first occurrence frequency of the first transmission resource set allocated in a time domain may be higher than a second occurrence frequency of the second transmission resource set allocated in the time domain.

In some embodiments, each of the first number of random access signals may correspond to a PRACH transmission.

In some embodiments, the information for one random access configuration may include an index for the one random access configuration indicating the plurality of transmission resource sets. In some embodiments, the information for two or more random access configurations may include respective indices for the two or more random access configurations indicating the plurality of transmission resource sets.

It should be appreciated that units included in the apparatuses 600 and 700 correspond to the blocks of the process 200 as well as the methods 400 and 500. Therefore, all operations and features described above with reference to FIGS. 2 to 5 are likewise applicable to the units included in the apparatuses 600 and 700 and have similar effects. For the purpose of simplification, the details will be omitted.

The units included in the apparatuses 600 and 700 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses 600 and 700 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Figure 8:
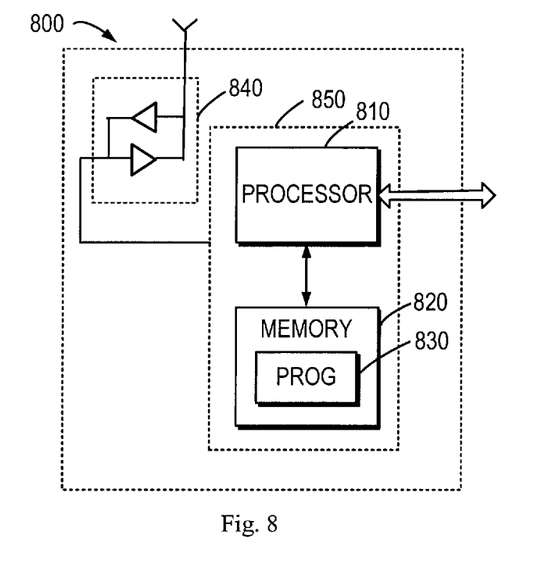
FIG. 8 is a simplified block diagram of a device that is suitable for implementing embodiments of the present disclosure.

FIG. 8 is a simplified block diagram of a device 800 that is suitable for implementing embodiments of the present disclosure. The device 800 can be considered as a further example implementation of the terminal device 120 or the network device 110 as shown in FIGS. 1 and 2. Accordingly, the device 800 can be implemented at or as at least a part of the terminal device 120 or the network device 110.

As shown, the device 800 includes a processor 810, a memory 820 coupled to the processor 810, a suitable transmitter (TX) and receiver (RX) 840 coupled to the processor 810, and a communication interface coupled to the TX/RX 840. The memory 820 stores at least a part of a program 830. The TX/RX 840 is for bidirectional communications. The TX/RX 840 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 830 is assumed to include program instructions that, when executed by the associated processor 810, enable the device 800 to operate in accordance with the embodiments of the present disclosure, as discussed herein with reference to FIGS. 2 to 7. The embodiments herein may be implemented by computer software executable by the processor 810 of the device 800, or by hardware, or by a combination of software and hardware. The processor 810 may be configured to implement various embodiments of the present disclosure. Furthermore, a combination of the processor 810 and memory 820 may form processing means 850 adapted to implement various embodiments of the present disclosure.

The memory 820 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 820 is shown in the device 800, there may be several physically distinct memory modules in the device 800. The processor 810 may be of any type suitable to the local technical network, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2, 6, and 7. Generally, program modules include routines, programs, libraries, objects, classes, components, data structures, or the like that perform particular tasks or implement particular abstract data types. The functionality of the program modules may be combined or split between program modules as desired in various embodiments.

Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented in a terminal device, comprising:
    selecting a first transmission resource set from a plurality of transmission resource sets based on one or more of the following:
        a determination that a beam-forming reciprocity capability of the terminal device is at a first level that is higher than a second level, and
        a determination that a radio quality of the terminal device in a serving area of a network device, corresponds to a first radio quality that is greater than a second radio quality,
        wherein the plurality of transmission resource sets are indicated in one or more random access configurations received from the network device, and respectively correspond to different numbers of random access transmissions; and
    transmitting, to the network device, up to a first number of random access signals in a random access request, wherein:
        the first number corresponds to the first transmission resource set, and
        the first number is less than a second number of random access transmissions associated with one or more of the following:
            the second level of beam-forming reciprocity capability of the terminal device, and
            the radio quality of the terminal device corresponding to the second radio quality.

2. The method of claim 1, wherein up to the first number of random access transmissions are transmitted in a single beam direction or in consecutive beam directions.

3. The method of claim 1, further comprising:
    in response to absence of a random access response for the random access request from the network device, selecting a second transmission resource set from the plurality of transmission resource sets, wherein the second transmission resource set corresponds to a second number of random access transmissions, and the second number is larger than the first number; and
    transmitting, to the network device, up to the second number of random access signals in a further random access request.

4. The method of claim 3, wherein the first transmission resource set occurs more frequently in a time domain than the second transmission resource set.

5. The method of claim 1, wherein each of the first number of random access signals corresponds to a physical random access channel transmission.

6. A method implemented in a network device, comprising:
    transmitting, to a terminal device, information for one or more random access configurations indicating a plurality of transmission resource sets that respectively correspond to different numbers of random access transmissions;
    determining whether a predetermined number of random access signals are received from the terminal device in a first transmission resource set of the plurality of transmission resource sets, wherein the predetermined number is at least one and at most a first number that corresponds to the first transmission resource set; and
    in response to a determination that the predetermined number of random access signals are received from the terminal device, identifying the received random access signals as belonging to one random access request, wherein:
        the plurality of transmission resource sets also includes a second transmission resource set that corresponds to a second number of random access signals, the second number being larger than the first number; and the first transmission resource set occurs more frequently in a time domain than the second transmission resource set.

7. The method of claim 3, wherein each of the first number of random access signals corresponds to a physical random access channel transmission.

8. The method of claim 3, wherein the information for one or more random access configuration includes one of the following:
- for one random access configuration, an index indicating the plurality of transmission resource sets; or
- for two or more random access configurations, respective two or more indices indicating the plurality of transmission resource sets.

9. An apparatus comprising a terminal device, the apparatus comprising:
- a processor; and
- a memory coupled to the processor and storing instructions that, when executed by the processor, configure the apparatus to:
  - select a first transmission resource set from a plurality of transmission resource sets based on one or more of the following:
    - a determination that a beam-forming reciprocity capability of the terminal device is at a first level that is higher than a second level, and
    - a determination that a radio quality of the terminal device, in a serving area of a network device, corresponds to a first radio quality that is greater than a second radio quality,
    - wherein the plurality of transmission resource sets are indicated in one or more random access configurations received from the network device, and respectively correspond to different numbers of random access transmissions; and
  - transmit, to the network device, up to a first number of random access signals in a random access request, wherein:
    - the first number corresponds to the first transmission resource set, and
    - the first number is less than a second number of random access transmissions associated with one or more of the following:
      - the second level of beam-forming reciprocity capability of the terminal device, and
      - the radio quality of the terminal device corresponding to the second radio quality.

10. The apparatus of claim 9, wherein the memory also includes instructions that, when executed by the processor, configure the apparatus to:
- in response to absence of a random access response for the random access request from the network device, select a second transmission resource set from the plurality of transmission resource sets, wherein the second transmission resource set corresponds to a second number of random access transmissions, and the second number is larger than the first number; and
- transmit, to the network device, up to the second number of random access signals in a further random access request.

11. The apparatus of claim 10, wherein the first transmission resource set occurs more frequently in a time domain than the second transmission resource set.

12. An apparatus comprising a network device, the apparatus comprising:
- a processor; and
- a memory coupled to the processor and storing instructions that, when executed by the processor, configure the apparatus to:
  - transmit, to a terminal device, information for one or more random access configurations indicating a plurality of transmission resource sets that respectively correspond to different numbers of random access transmissions;
  - determine whether a first a predetermined number of random access signals are received from the terminal device in a first transmission resource set of the plurality of transmission resource sets, wherein the predetermined number is at least one and at most a first number that corresponds to the first transmission resource set; and
  - in response to a determination that the predetermined number of random access signals are received from the terminal device, identify the received random access signals as belonging to one random access request, wherein:
    - the plurality of transmission resource sets also includes a second transmission resource set that corresponds to a second number of random access signals, the second number being larger than the first number; and
    - the first transmission resource set occurs more frequently in a time domain than the second transmission resource set.

13. The apparatus of claim 12, wherein the information for one or more random access configuration includes one of the following:
- for one random access configuration, an index indicating the plurality of transmission resource sets; or
- for two or more random access configurations, respective two or more indices indicating the plurality of transmission resource sets.

14. A non-transitory, computer-readable medium storing computer-executable instructions that, when executed by the processor of a terminal device, configure the terminal device to perform operations corresponding to the method of claim 1.

* * * * *